United States Patent
Sharma et al.

(10) Patent No.: US 12,067,293 B2
(45) Date of Patent: Aug. 20, 2024

(54) DATA STORAGE DEVICE AND METHOD FOR HOST MULTI-COMMAND QUEUE GROUPING BASED ON WRITE-SIZE ALIGNMENT IN A MULTI-QUEUE-DEPTH ENVIRONMENT

(71) Applicant: Western Digital Technologies, Inc., San Jose, CA (US)

(72) Inventors: Amit Sharma, Bengaluru (IN); Dinesh Kumar Agarwal, Bangalore (IN); Abhinandan Venugopal, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 1 day.

(21) Appl. No.: 17/746,019

(22) Filed: May 17, 2022

(65) Prior Publication Data
US 2023/0409234 A1  Dec. 21, 2023

(51) Int. Cl.
G06F 3/06 (2006.01)

(52) U.S. Cl.
CPC .......... *G06F 3/0659* (2013.01); *G06F 3/0613* (2013.01); *G06F 3/0688* (2013.01); *G06F 2212/7203* (2013.01)

(58) Field of Classification Search
CPC .... G06F 3/0659; G06F 3/0613; G06F 3/0688; G06F 2212/7203
See application file for complete search history.

(56) References Cited

U.S. PATENT DOCUMENTS

| | | | |
|---|---|---|---|
| 6,714,448 B2 | 3/2004 | Manea | |
| 7,580,292 B2 | 8/2009 | Ho et al. | |
| 7,701,768 B2 | 4/2010 | Hwang | |
| 11,074,199 B2* | 7/2021 | Heinrich | G06F 12/0246 |
| 2002/0056047 A1* | 5/2002 | Lehman | G06F 11/366 |
| | | | 714/E11.21 |
| 2008/0232164 A1 | 9/2008 | Tsai et al. | |
| 2009/0327591 A1 | 12/2009 | Moshayedi | |
| 2010/0223539 A1* | 9/2010 | Nowoczynski | G06F 3/067 |
| | | | 709/217 |
| 2013/0326141 A1* | 12/2013 | Marcu | G06F 3/0679 |
| | | | 711/159 |
| 2019/0188153 A1* | 6/2019 | Benisty | G06F 3/0611 |
| 2023/0014508 A1* | 1/2023 | Kanno | G11C 16/10 |

* cited by examiner

*Primary Examiner* — Kalpit Parikh
(74) *Attorney, Agent, or Firm* — Crowell & Moring LLP

(57) ABSTRACT

A data storage device and method are provided for host multi-command queue grouping based on write-size alignment in a multi-queue-depth environment. In one embodiment, a data storage device is provided comprising a memory and a controller. The controller is configured to provide a host with an indication of a required amount of data needed to program a set of multi-level cell blocks in the memory; receive an assurance from the host that the host will be providing the data storage device with the required amount of data; and based on the assurance received from the host, program the set of multi-level cell blocks as data is received from the host but before the required amount of data is received from the host. Other embodiments are possible, and each of the embodiments can be used alone or together in combination.

20 Claims, 13 Drawing Sheets

Device Store and Forward Method of TLC Programming

DATA STORAGE DEVICE AND METHOD FOR HOST MULTI-COMMAND QUEUE GROUPING BASED ON WRITE-SIZE ALIGNMENT IN A MULTI-QUEUE-DEPTH ENVIRONMENT

BACKGROUND

A data storage device can be used to store data sent from a host. Multi-level cell (MLC) data storage devices store multiple bits per memory cell. X3 (three-bits per cell) and X4 (four-bits per cell) are commonly used today, and X5 (five-bits per cell) is currently being developed. To program an MLC block of memory cells in a data storage device, a certain amount of data is required, where the amount of required data can vary based on memory type. In operation, host data is first transferred by the data storage device to an internal buffer, and, after a sufficient amount of data is stored in the buffer, the MLC program process is started.

DETAILED DESCRIPTION

Overview

Figure 1A:
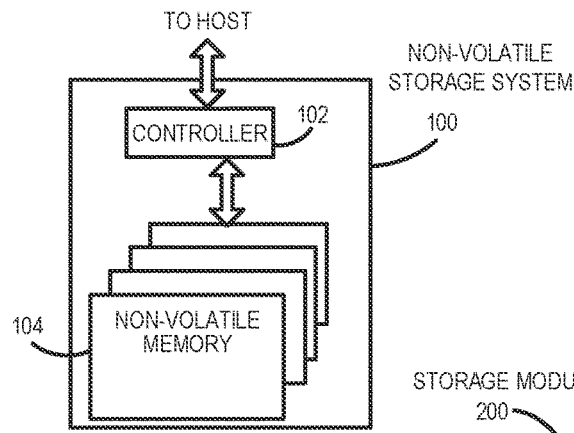
FIG. 1A is a block diagram of a data storage device of an embodiment.

By way of introduction, the below embodiments relate to a data storage device and method for host multi-command queue grouping based on write-size alignment in a multi-queue-depth environment. In one embodiment, a data storage device is provided comprising a memory and a controller. The controller is configured to provide a host with an indication of a required amount of data needed to program a set of multi-level cell blocks in the memory; receive an assurance from the host that the host will be providing the data storage device with the required amount of data; and based on the assurance received from the host, program the set of multi-level cell blocks as data is received from the host but before the required amount of data is received from the host.

In some embodiments, the assurance is received via a special host directive.

In some embodiments, the data storage device further comprises volatile memory, wherein a capacity of the volatile memory is less than the required amount of data.

In some embodiments, the data storage device further comprises volatile memory, wherein a capacity of the volatile memory is at least the required amount of data.

In some embodiments, the data is programmed in the multi-level cell block without first programming the data in a single-level cell block.

In some embodiments, the indication is provided in response to a request from the host.

In some embodiments, the indication is provided based on controller initiative.

In some embodiments, the controller is further configured to provide the host with an indication of a required amount of data needed to program a second set of multi-level cell blocks in the memory.

In some embodiments, the memory comprises a three-dimensional memory.

In another embodiment, a method is provided that is performed in a host in communication with a data storage device. The method comprises receiving, from the data storage device, a write-alignment size; creating a command group to satisfy the write-alignment size; and sending an indication to the data storage device that an amount of data associated with the command group satisfies the write-alignment size.

In some embodiments, the indication is sent as a special host directive.

In some embodiments, the write-alignment size is received in response to a request sent to the data storage device.

In some embodiments, the write-alignment size is received without first sending a request for the write-alignment size to the host.

In some embodiments, the method further comprises receiving, from the data storage device, a second write-alignment size.

In some embodiments, the method further comprises dynamically changing the command group based on the second write-alignment size.

In some embodiments, the command group comprises a plurality of commands from a plurality of applications on the host.

In some embodiments, the plurality of commands are stored in a queue shared by the plurality of applications.

In some embodiments, each of the plurality of applications generates a different workload.

In some embodiments, the method further comprises selecting the plurality of commands from a larger set of commands.

In another embodiment, a data storage device is provided comprising: a memory; means for providing a host with a write-step size for the memory; means for receiving an assurance from the host that the host will be providing the data storage device with an amount of data to satisfy the write-step size; and means for programming the memory without first verifying that the amount of data to satisfy the write-step size was received from the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
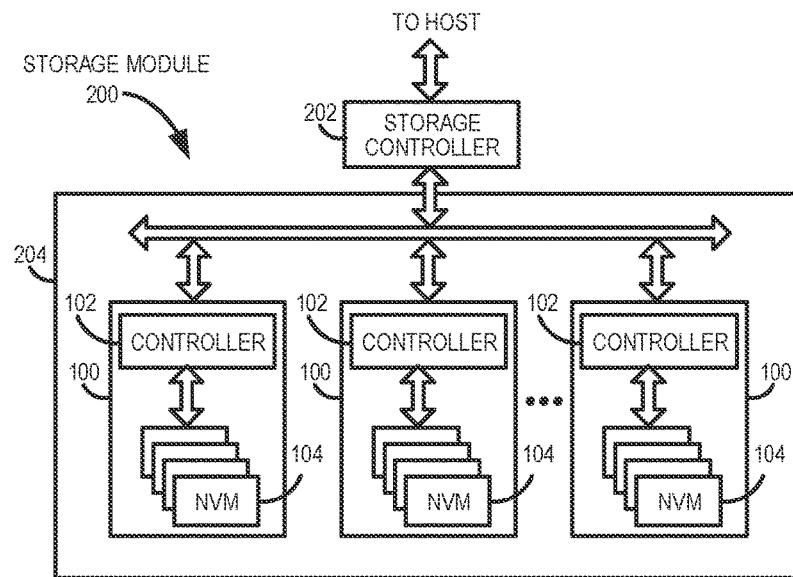
FIG. 1B is a block diagram illustrating a storage module of an embodiment.
Figure 1C:
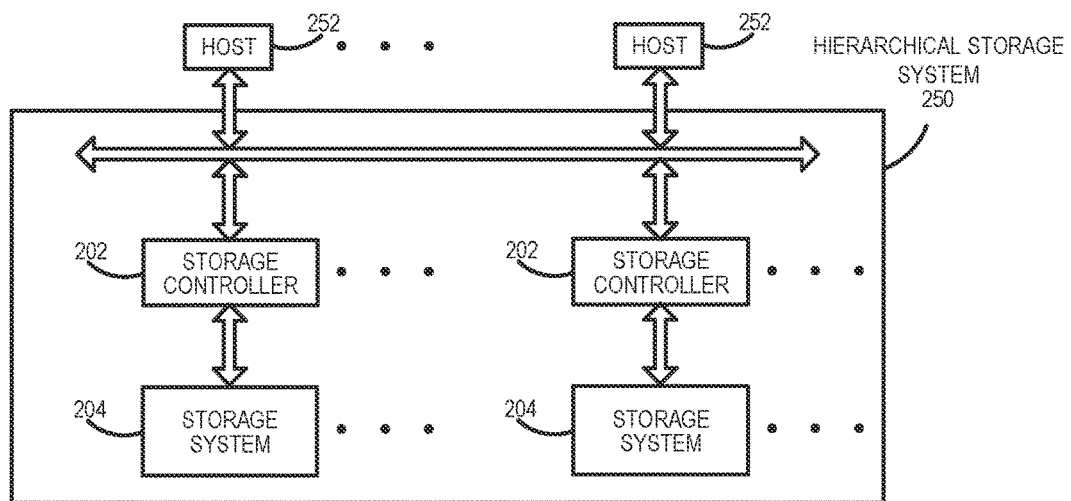
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC) or multiple-level cells (MLC) (such as triple-level cells (TLC) or quad-level cells (QLC)), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
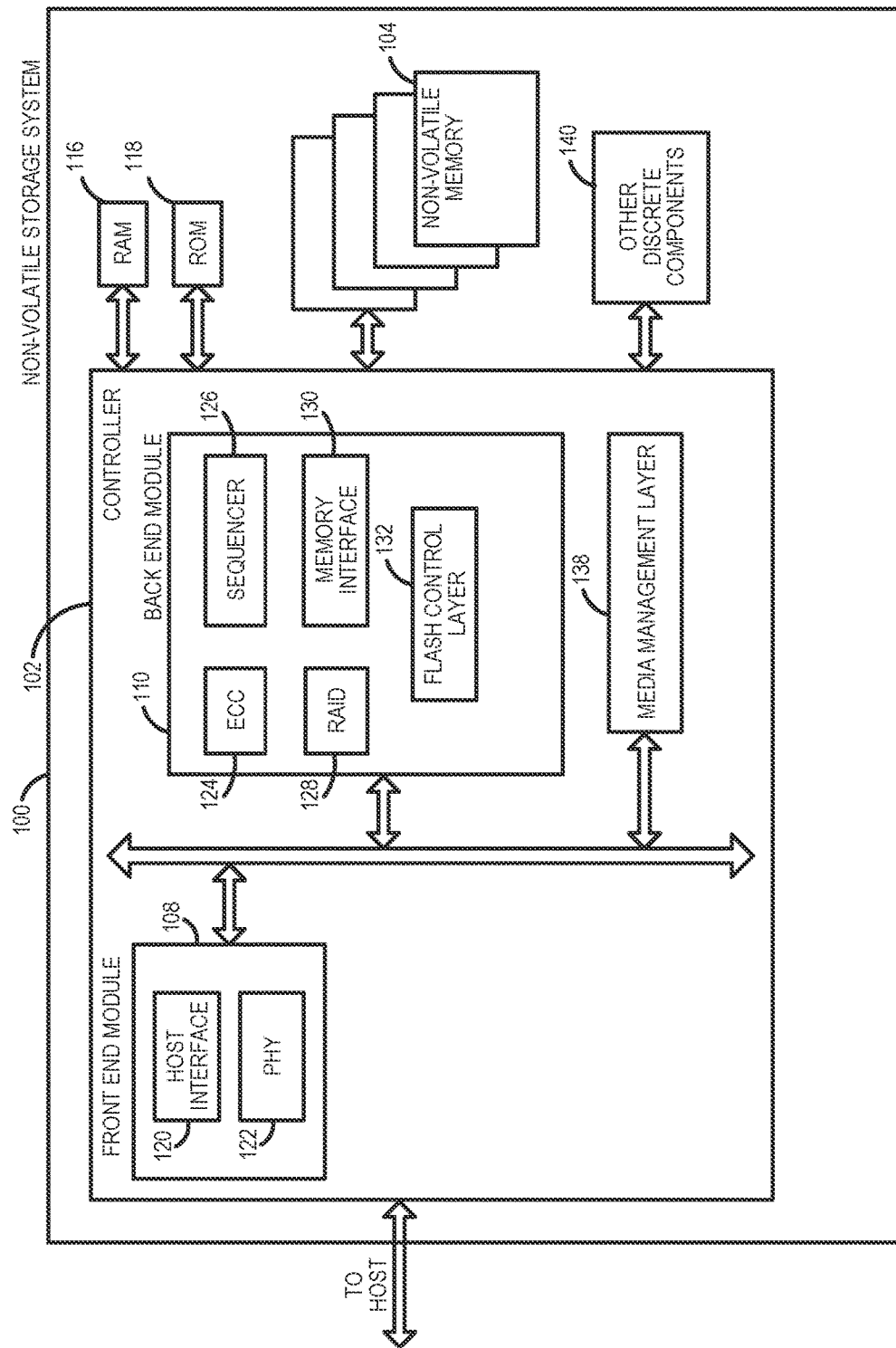
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
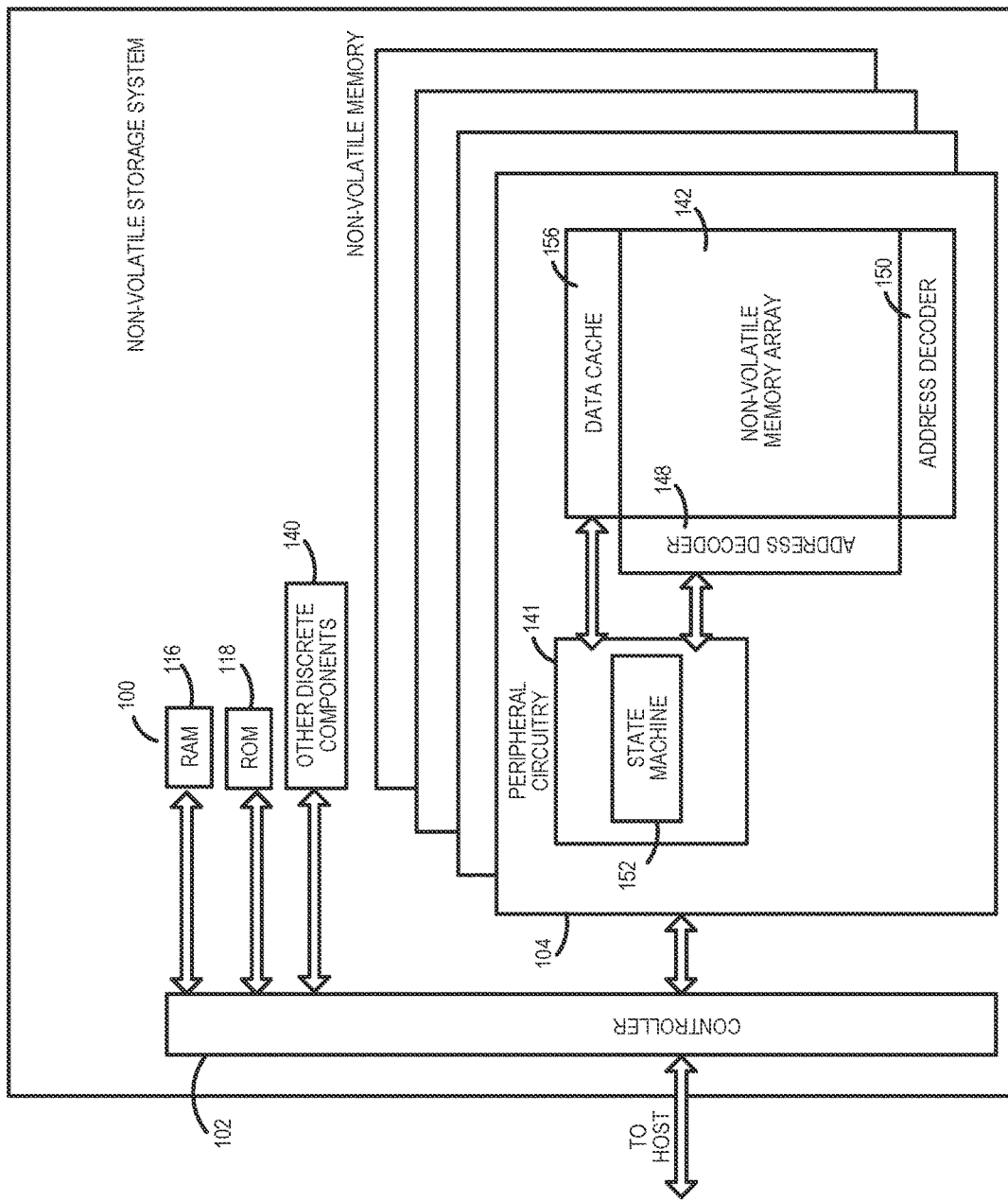
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
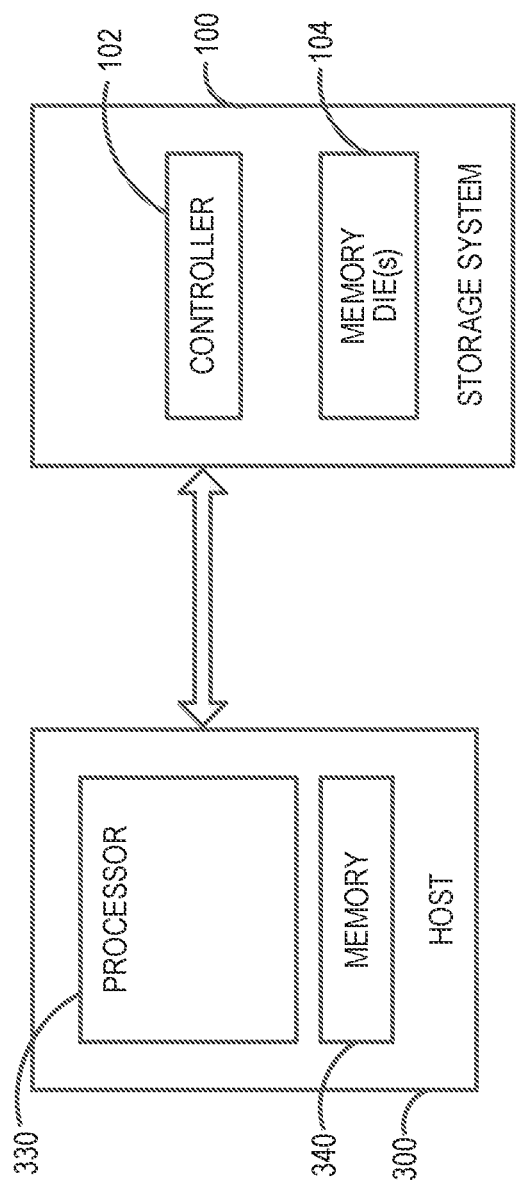
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As discussed above, multi-level cell (MLC) data storage devices store multiple bits per memory cell. X3 (three-bits per cell) and X4 (four-bits per cell) are commonly used today, and X5 (five-bits per cell) is currently being developed. To program an MLC block of memory cells in a data storage device, a certain amount of data is required, where the amount of required data can vary based on memory type. In operation, host data is first transferred by the data storage device to an internal buffer, and, after a sufficient amount of data is stored in the buffer, the MLC program process is started.

Figure 4:
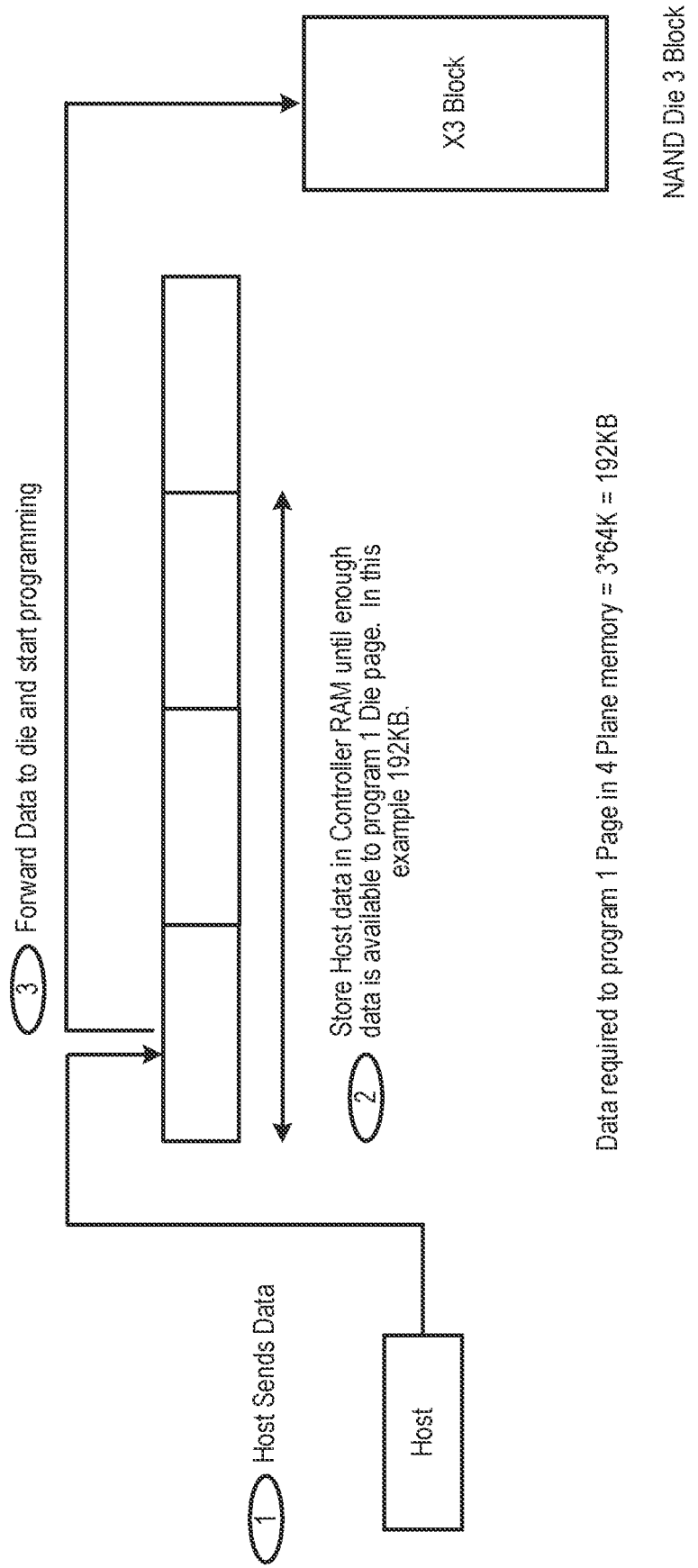
FIG. 4 is a diagram that illustrates a store-and-forward method of a triple-level cell programming operation of an embodiment.

FIG. 4 is a diagram that illustrates a store-and-forward method of an X3 (triple-level cell (TLC)) programming operation. As shown in FIG. 4, the host sends data to the data storage device (act 1), and the controller in the data storage device stores the data in controller RAM (or volatile memory somewhere else in the data storage device 100) until there is enough data to program one die page in the memory (act 2). In this example, the amount of data required is 192 kilobytes (KB), which is the amount of data required to program one page in a four-plane memory (3*64 KB). When enough data has been stored, the controller forwards the data to the memory die and starts programming (act 3).

Figure 5:
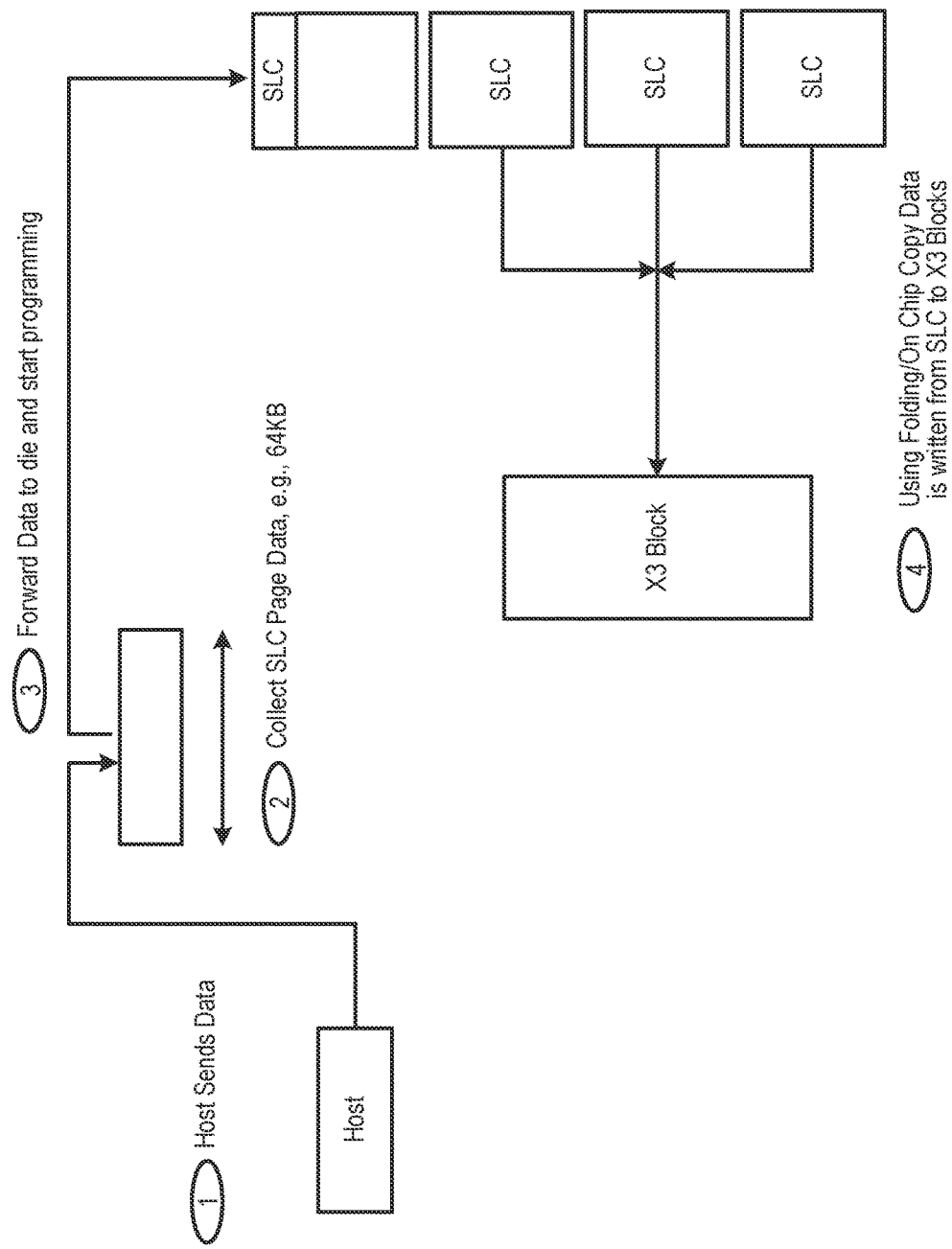
FIG. 5 is a diagram that illustrates a multi-level cell programming operation of an embodiment.

As can be seen from this example, the memory type (e.g., X3/X4/X5 and number of planes) drives the data storage device's internal RAM requirement. Additionally, due to performance reasons, the data storage device may also need to store two-dies-worth of data. For example, in X4, four plane (4P) programming of two dies, 768 (i.e., 4*16K*4*2) KB of RAM would be required. Upcoming memory generations are being planned that have more planes and more bits per cell, which would further increase the controller's RAM requirement. However, cost-constrained data storage devices do not have a large internal RAM dedicated for host data. Hence, those data storage devices do not program MLC blocks directly. Instead, they first program data is SLC memory and then fold the data from the SLC memory to the MLC memory, as illustrated in FIG. 5. However, a data storage device that cannot program directly to MLC blocks can have several drawbacks. For example, such data storage device can experience reduced performance as the same host data is programmed twice (first to SLC and then from SLC to MLC). Due to this double programming, the memory can experience reduced endurance.

Figure 6:
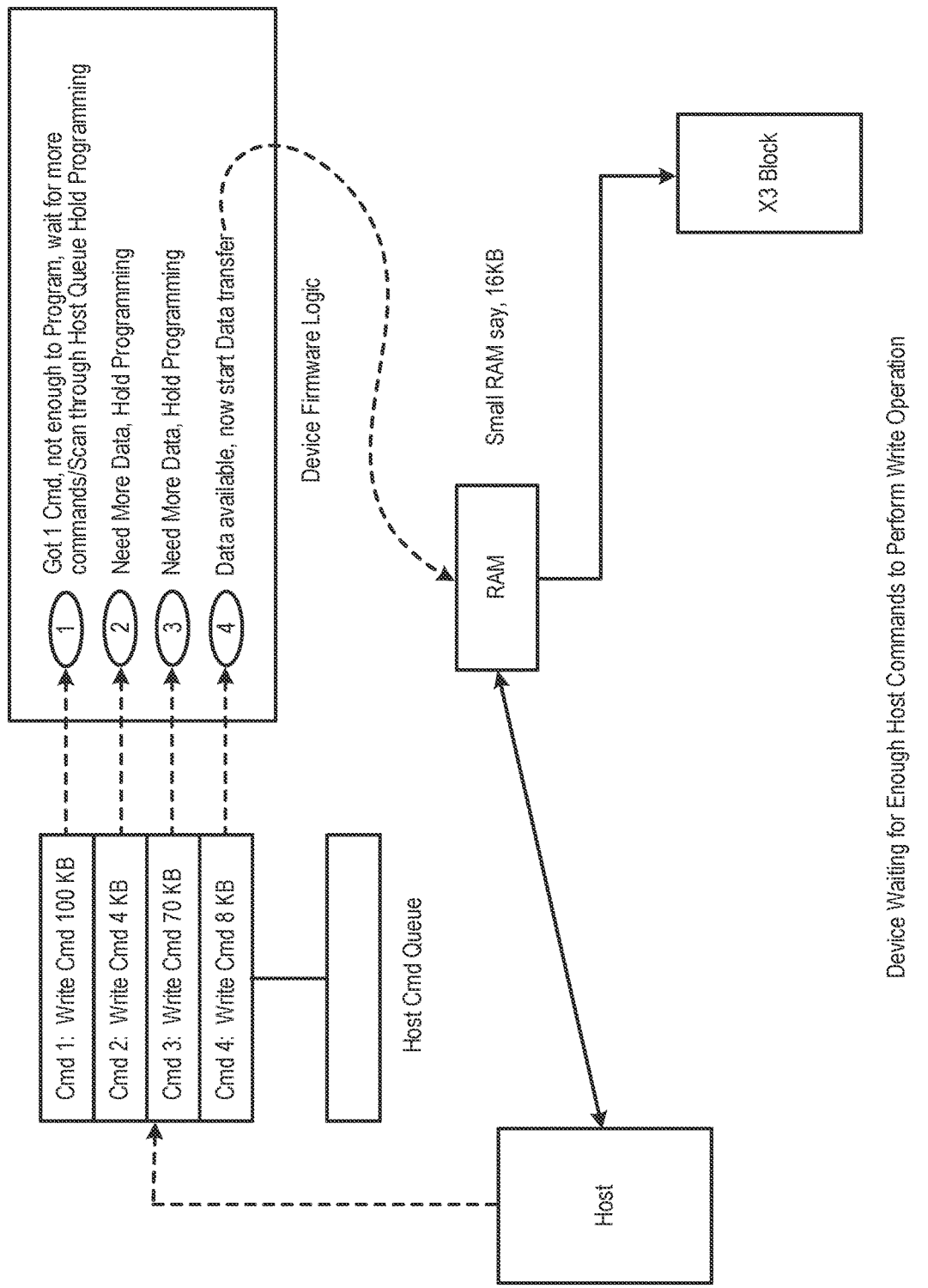
FIG. 6 is an illustration of a data storage device of an embodiment that is awaiting enough host commands to perform a write operation.

Also, to avoid a partial data write, some data storage devices use a store-and-forward method to make sure that all data (e.g., 192 KB or 384 KB) required to perform a TLC write is available before attempting to program TLC blocks. A partial data write (e.g., when 192 KB of data is required, but the host only sends 188 KB) can be very complicated and result in partial data loss. As shown in FIG. 6, in the store-and-forward method, the controller of the data storage device can analyze all pending host write commands and only start a write data transfers when a sufficient amount of write data is available to program a memory die. While reducing the controller's RAM requirement, this approach can have several disadvantages. For example, the controller would need to perform logic before a data transfer could be initiated, which can be in conflict with the store-and-forward approach of starting a data transfer to the internal buffer as soon as the command is received by the data storage device. So, the data storage device would need to delay the data transfers until a sufficient amount of commands are processed by the data storage device to ensure that enough data is available to perform the write operation. Additionally, the host may not send enough commands, in which case the data storage device would need to route the data to SLC blocks.

The following embodiments can be used to address these problems. In one embodiment, the host 300 forms a command group based on a device write-alignment size. (As used here, a "write-alignment size," "write step," or "write size" can refer to a required amount of data needed to program a set of (one or more) multi-level cell blocks in the memory 104.) A new directive can be passed to the data storage device 100 that allows the data storage device 100 to program a set of (one or more) MLC blocks directly with low RAM without first receiving all of the data needed to satisfy the write-alignment size. The device write-alignment size can dynamically change, so that the host 300 can serve various pending command loads in an optimal manner. In general, these embodiments can involve one or more of the following features: a dynamic write alignment size selection by the host 300, the host 300 generating a command grouping based on write size of the data storage device 100, and the data storage device 100 handling special write-aligned commands without using a store-and-forward technique. In some embodiments, the host 300 can negotiate with the data storage device 100 to determine the write size. Once the write size is known, the host 300 can try to group commands to match the write-step size. If a command group can be formed to match-up with the data storage device's write alignment size, command group information can be passed to the data storage device 100 through a special host directive. Based on this host directive, the data storage device 100 can be assured that the required amount of data will be coming from the host 300 and, hence, can start the program operations immediately without first collecting and verifying that the required amount of data has been received and stored in RAM. In this way, these embodiments provide a "non-store-and-forward approach."

Any suitable technique can be used for the host 300 to learn about the data storage device's write size to an MLC block. For example, in one embodiment, a dynamic host-device handshake is used to obtain the write-alignment size. In general, the amount of internal RAM the data storage device 100 needs for store-and-forward operations can vary based on multiple factors, such as, but not limited to, whether the data storage device 100 is writing to an SLC region or TLC region, memory geometry (e.g., number of planes, die interleave, etc.), and whether the data storage device 100 is in a relocation (non-performance) path (where the data storage device 100 is performing internal housekeeping work, and host data would be going at slower pace).

In general, it may be desired to keep the write-alignment size (or current write-step size) as low as possible, as the smaller the write-step size, the greater the opportunity for the host 300 to form an optimal command group. A write-alignment size that is too large can put restrictions on the host's capability to group commands because a sufficient number of commands may not be pending at a given time. The write-step size can be queried either by the host 300 or by the data storage device 100. For example, the data storage device 100 can initiate a communication to the host 300 regarding a change in write-step size, or the host 300 can query the data storage device 100 if it has a smaller workload to check the latest step size.

Figure 7:
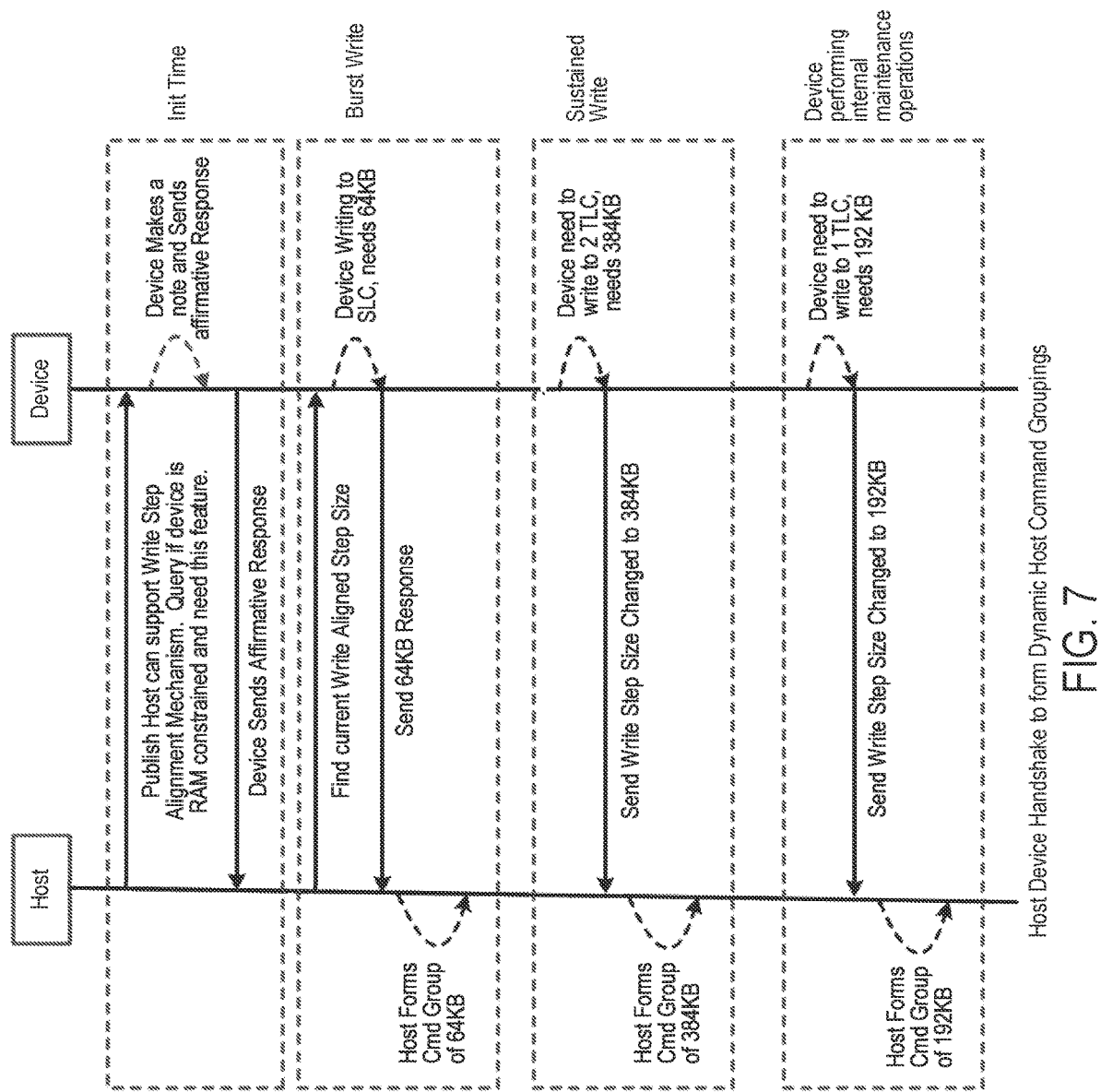
FIG. 7 is a diagram that illustrates a host-device handshake of an embodiment.

FIG. 7 is a diagram that illustrates how the host 300 and data storage device 100 can educate themselves about the write-step formation capabilities of the host 300 and subsequent communication about write-step-size changes. FIG. 7 shows the data storage device 100 communicating the write-step-size changes to the host 300, but the host 300 can also query about the current write-step size (e.g., when command load is not enough to match the current write size).

Figure 8:
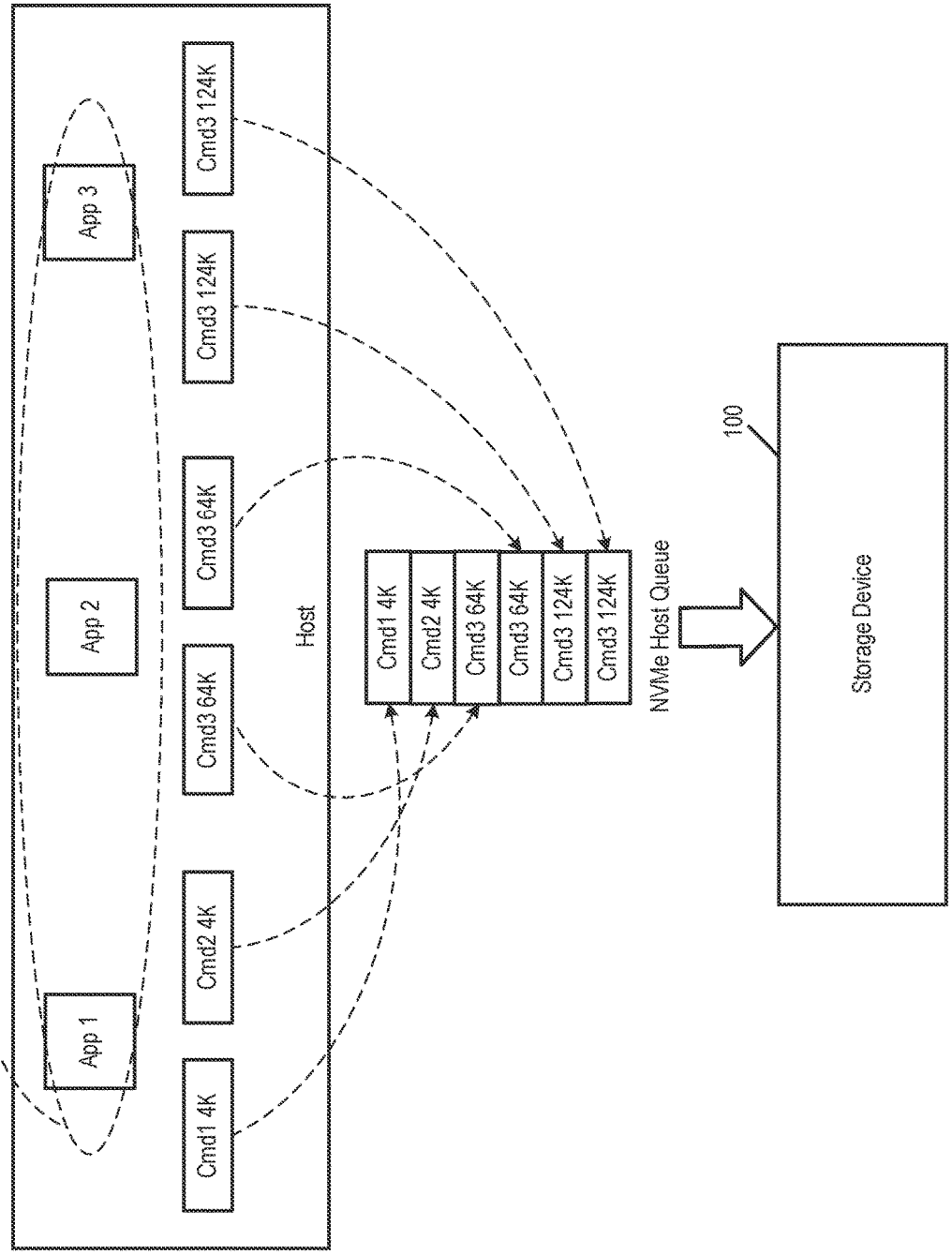
FIG. 8 is a diagram that illustrates a method of an embodiment for generating data writes of different sizes.
Figure 9:
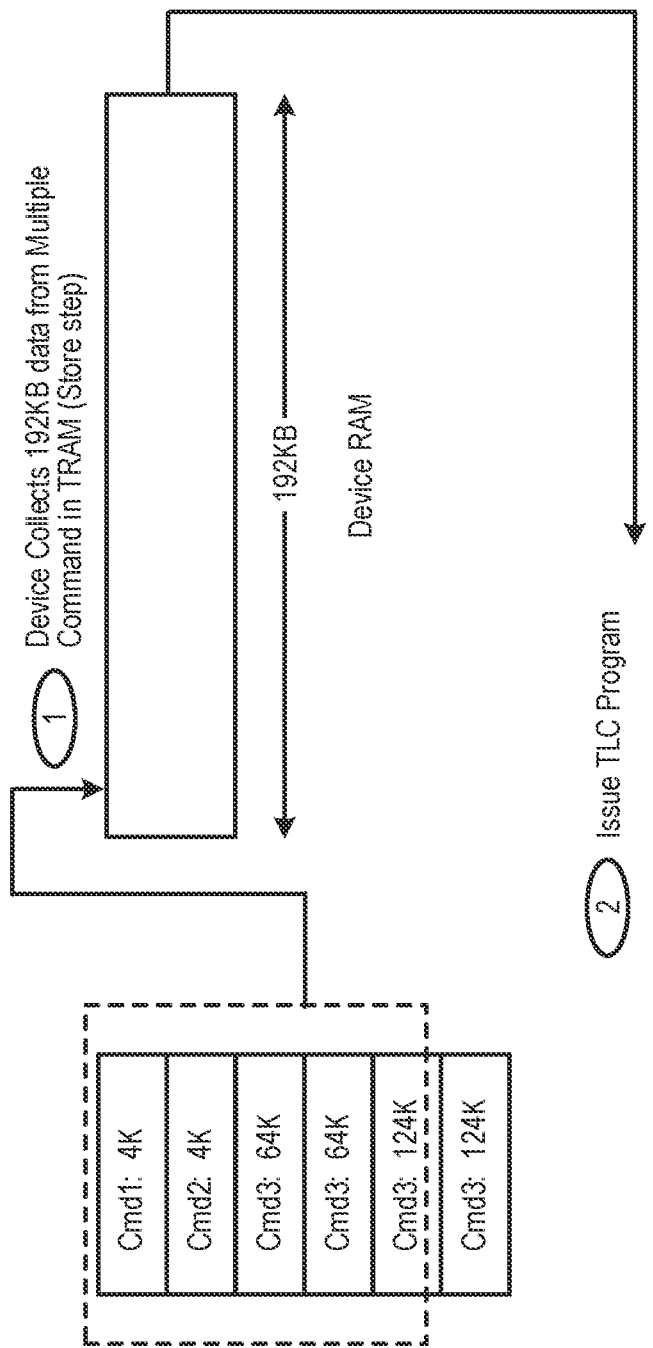
FIG. 9 is a diagram that illustrates a store-and-forward method of an embodiment.

The host 300 can generate multiple type of loads as part of the host-side dynamic command grouping process. For example, various types of applications running on the host 300 can generate the different kinds of command loads (e.g., 4K, 8K, 64K etc.). FIG. 8 (host side) and FIG. 9 (device side) illustrate one such example, where three applications are generating different kinds of write loads. The host 300 can queue-up these pending commands to the data storage device 100 (e.g., using NVMe host queues).

Figure 10:
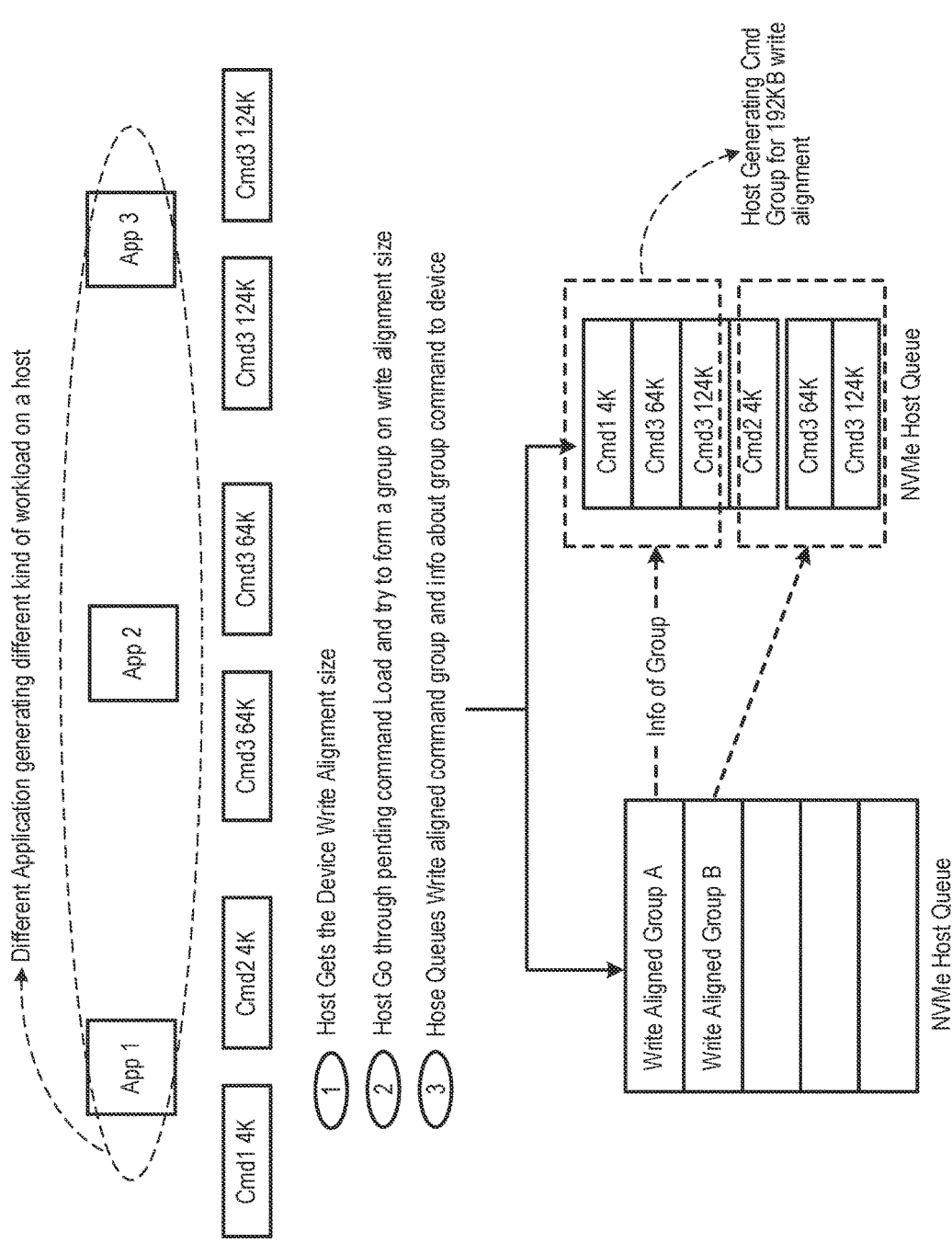
FIG. 10 is a diagram that illustrates a method of an embodiment for generating a command group.
Figure 11:
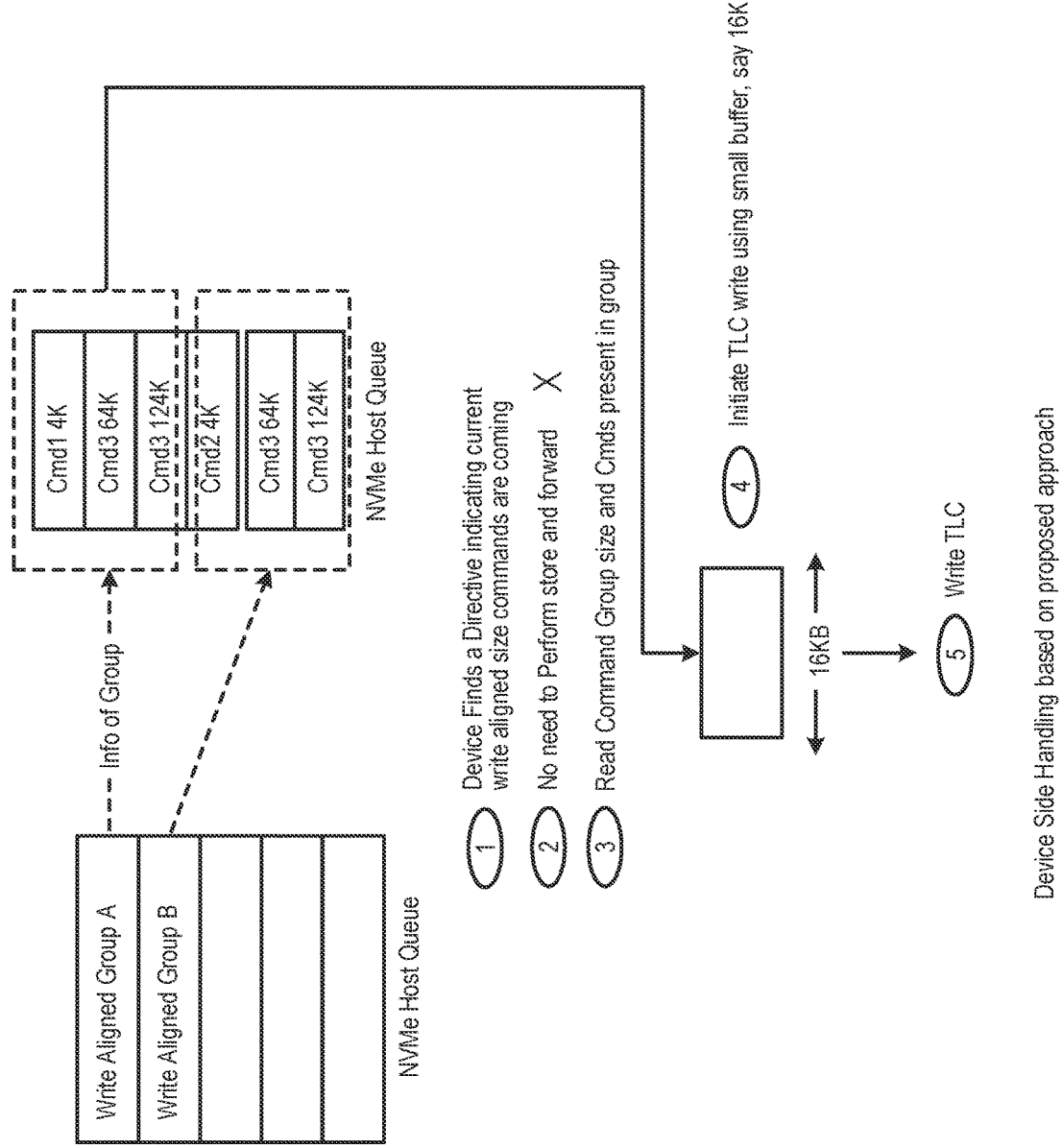
FIG. 11 is a diagram that illustrates a device-side handling method of an embodiment.
Figure 12:
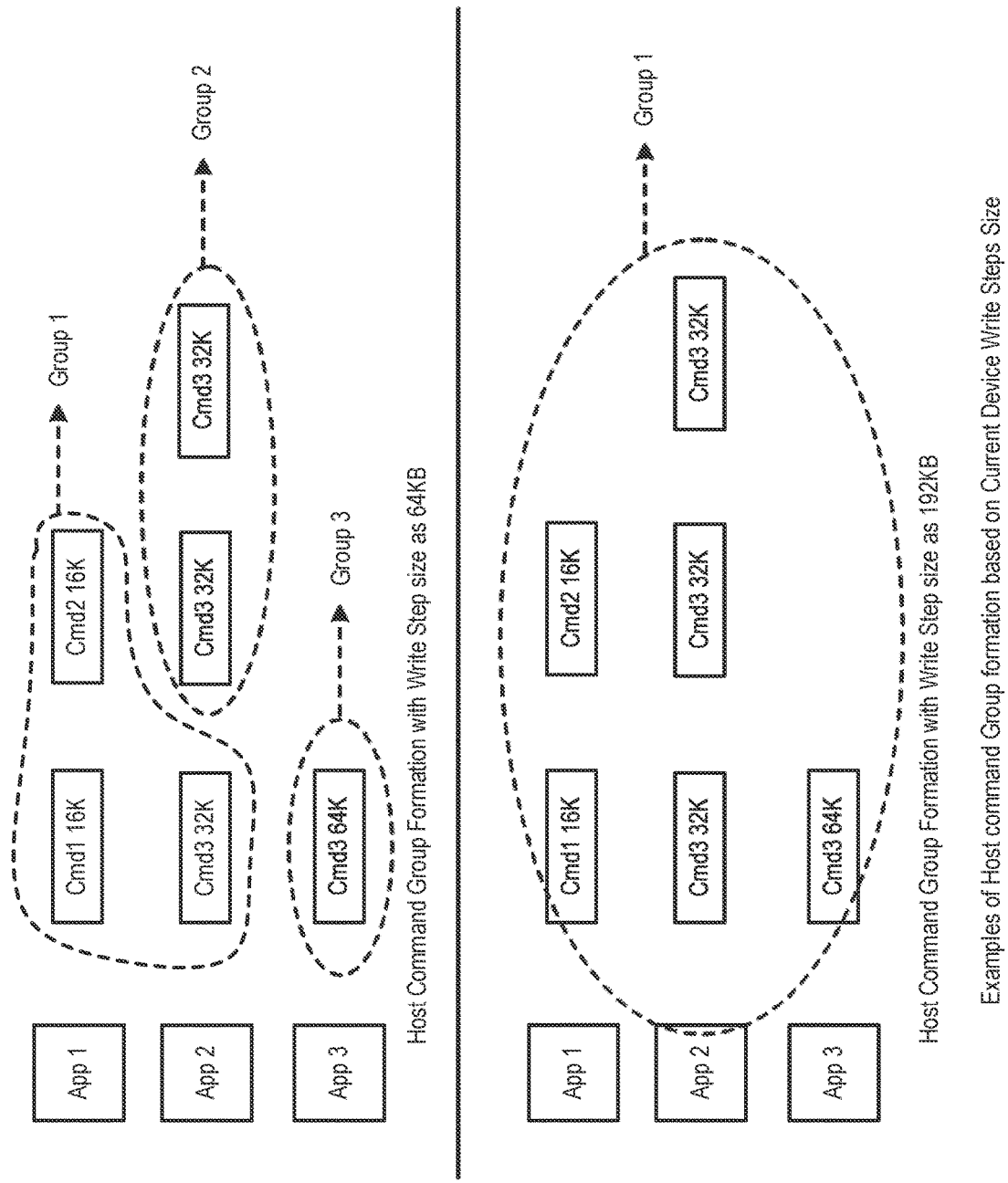
FIG. 12 is an illustration of examples of a host command group formation process of an embodiment.

In contrast to handling this kind of load by either requiring higher RAM or accepting lower performance, by providing host awareness about the current write size, once the device requirement for the current write is known to the host 300, the host 300 can group multiple commands to align with the device requirement. On group formation, the host 300 can provide an assurance (e.g., a directive, an indicator, a control bit, an instruction, a code, pre-determined data, etc.) to the data storage device 100 indicating that "data aligned to TLC write" is guaranteed to be coming from a given command group. On seeing this directive, the controller 102 in the data storage device 100 can immediately start data transfers before all the data is received from the host 300 and without verifying that the amount of received data is the required amount. This can be implemented in any suitable way, such as, but not limited to, having a special host queue (e.g., NVMe queue) that have special commands with grouping directives. Once this information is available, the controller 102 can directly start programming received data from the host 300 in the set of MLC blocks without worrying that it may eventually receive less or more than the required amount of data. This is illustrated in FIG. 10 (host side) and FIG. 11 (device side). It should be noted that the host command grouping logic can be dynamically changing based on the write-step size, as illustrated in the example shown in FIG. 12.

There are several advantages associated with these embodiments. For example, these embodiments can provide higher performance in cost-constrained environments, as these embodiments do not require additional RAM in the host 300 or the data storage device 100. As another example, these embodiments can provide higher device endurance because data would be written directly to TLC blocks, avoiding double programming of data (e.g., SLC then TLC programming), thereby increasing device life.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a volatile memory;
    a non-volatile memory; and
    a processor configured to:
        provide a host with an indication of a required amount of data needed to program a set of multi-level cell blocks in the non-volatile memory;
        receive an assurance from the host that the host will provide the data storage device with the required amount of data; and
        based on the assurance received from the host, program the set of multi-level cell blocks in the non-volatile memory as data is received from the host into the volatile memory instead of after all of the required amount of data is received from the host and stored in the volatile memory, since a capacity of the volatile memory is less than the required amount of data.

2. The data storage device of claim 1, wherein the assurance is received via a special host directive.

3. The data storage device of claim 1, wherein the data is programmed in the multi-level cell block without first programming the data in a single-level cell block.

4. The data storage device of claim 1, wherein the indication is provided in response to a request from the host.

5. The data storage device of claim 1, wherein the indication is provided independent of a request from the host.

6. The data storage device of claim 1, wherein the processor is further configured to provide the host with an indication of a required amount of data needed to program a second set of multi-level cell blocks in the non-volatile memory.

7. The data storage device of claim 1, wherein the non-volatile memory comprises a three-dimensional memory.

8. A method comprising:
    performing the following in a host in communication with a data storage device, wherein the data storage device comprises a volatile memory and a non-volatile memory:
        receiving, from the data storage device, a write-alignment size;
        creating a command group to satisfy the write-alignment size;
        sending an indication to the data storage device that an amount of data associated with the command group satisfies the write-alignment size; and
        sending the amount of data to the data storage device;
    wherein:
        the data storage device is configured to program the non-volatile memory with the amount of data as the amount of data is received from the host into the volatile memory instead of after all of the amount of data is received from the host and stored in the volatile memory, since a capacity of the volatile memory is less than the amount of data.

9. The method of claim 8, wherein the indication is sent as a special host directive.

10. The method of claim 8, wherein the write-alignment size is received in response to a request sent to the data storage device.

11. The method of claim 8, wherein the write-alignment size is received without first sending a request for the write-alignment size to the data storage device.

12. The method of claim 8, further comprising receiving, from the data storage device, a second write-alignment size.

13. The method of claim 12, further comprising dynamically changing the command group based on the second write-alignment size.

14. The method of claim 8, wherein the command group comprises a plurality of commands from a plurality of applications on the host.

15. The method of claim 14, wherein the plurality of commands is stored in a queue shared by the plurality of applications.

16. The method of claim 14, wherein each application of the plurality of applications generates a different workload.

17. The method of claim 14, further comprising selecting the plurality of commands from a larger set of commands.

18. The method of claim 8, wherein the non-volatile memory comprises a three-dimensional memory.

19. The method of claim 16, wherein the different workload comprises a different write load.

20. A data storage device comprising:
    a volatile memory;
    a non-volatile memory;
    means for providing a host with a write-step size for the non-volatile memory;

means for receiving an assurance from the host that the host will provide the data storage device with an amount of data to satisfy the write-step size; and means for programming the non-volatile memory with the amount of data as the amount of data is received from the host into the volatile memory instead of after all of the amount of data is received from the host and stored in the volatile memory, since a capacity of the volatile memory is less than the amount of data.

\* \* \* \* \*